US012631272B2

(12) United States Patent
Pawlik et al.

(10) Patent No.: US 12,631,272 B2
(45) Date of Patent: May 19, 2026

(54) HOUSING ASSEMBLY FOR USE IN A HEAT EXCHANGE SYSTEM

(71) Applicant: Danfoss A/S, Nordborg (DK)

(72) Inventors: Jens Pawlik, Broager (DK); Michael Birkelund, Middelfart (DK)

(73) Assignee: DANFOSS A/S, Nordborg (DK)

( * ) Notice: Subject to any disclaimer, the term of this patent is extended or adjusted under 35 U.S.C. 154(b) by 0 days.

(21) Appl. No.: 18/877,653

(22) PCT Filed: Apr. 17, 2023

(86) PCT No.: PCT/EP2023/059934
§ 371 (c)(1),
(2) Date: Dec. 20, 2024

(87) PCT Pub. No.: WO2024/008343
PCT Pub. Date: Jan. 11, 2024

(65) Prior Publication Data
US 2025/0383037 A1     Dec. 18, 2025

(30) Foreign Application Priority Data

Jul. 4, 2022     (DK) .............................. PA202200643

(51) Int. Cl.
*F16L 19/025*     (2006.01)
*F28F 9/26*     (2006.01)
(52) U.S. Cl.
CPC .............. *F16L 19/025* (2013.01); *F28F 9/26* (2013.01)
(58) Field of Classification Search
CPC ....... F16L 58/08; F16L 58/181; F16L 58/184; F16L 13/16; F16L 13/168; F16L 13/02; F16L 13/0254; F16L 13/0263; F16L 13/0272; F16L 19/0243; F16L 19/028; F16L 19/0286; F28F 9/18; F28F 9/182; F28F 19/06; F28F 21/089
See application file for complete search history.

(56) References Cited

U.S. PATENT DOCUMENTS 619,437 A * 2/1899 Pool .................... F16L 19/0286
                                                      285/133.11
2,386,747 A * 10/1945 Ris ........................ F28F 19/002
                                                      29/523

(Continued)

FOREIGN PATENT DOCUMENTS

CN     201242313 Y     5/2009
CN     102003846 A     4/2011

(Continued)

OTHER PUBLICATIONS

International Search Report mailed Jul. 25, 2023, in connection with corresponding International Application No. PCT/EP2023/059934; 3 pages.

*Primary Examiner* — Aaron M Dunwoody
(74) *Attorney, Agent, or Firm* — McCormick, Paulding & Huber PLLC

(57) ABSTRACT

A housing assembly for use in a heat exchange system includes an aluminium housing with at least two fluid ports, wherein each fluid port is connected to a bi-metal connector, wherein the bi-metal connector includes an inner copper layer and an outer stainless steel layer, and wherein the aluminium housing includes connection portions for connecting the bi-metal connectors.

13 Claims, 6 Drawing Sheets

(56)        References Cited

U.S. PATENT DOCUMENTS

| | | | | |
|---|---|---|---|---|
| 2,613,958 | A * | 10/1952 | Richardson | F16L 19/04 |
| | | | | 138/140 |
| 3,042,428 | A | 7/1962 | Gardiner | |
| 3,584,655 | A * | 6/1971 | Frank | F16L 58/08 |
| | | | | 138/143 |
| 4,023,557 | A * | 5/1977 | Thorne | B21C 1/22 |
| | | | | 126/677 |
| 4,469,356 | A * | 9/1984 | Duret | F16L 19/028 |
| | | | | 29/523 |
| 4,893,657 | A * | 1/1990 | Usui | F16L 19/0243 |
| | | | | 285/333 |
| 6,477,846 | B2 * | 11/2002 | Yundt, Jr. | F28F 19/06 |
| | | | | 62/71 |
| 6,536,806 | B1 * | 3/2003 | Uematsu | F16L 58/08 |
| | | | | 285/55 |
| 8,602,459 | B2 | 12/2013 | Lockwood | |
| 9,803,781 | B2 * | 10/2017 | Kikuno | F16L 13/08 |
| 10,663,094 | B2 | 5/2020 | Braathen | |
| 2011/0220237 | A1 * | 9/2011 | Okamoto | B21D 39/04 |
| | | | | 138/140 |
| 2012/0073323 | A1 * | 3/2012 | Lockwood | F16L 15/04 |
| | | | | 285/242 |
| 2013/0319568 | A1 * | 12/2013 | Daugherty | B32B 1/08 |
| | | | | 285/332 |
| 2013/0319569 | A1 * | 12/2013 | Kikuno | B23K 1/002 |
| | | | | 138/109 |
| 2014/0001749 | A1 * | 1/2014 | Jensen | F16L 19/028 |
| | | | | 285/222.1 |
| 2016/0201841 | A1 * | 7/2016 | Heutchy | F16L 58/184 |
| | | | | 285/55 |
| 2016/0230725 | A1 * | 8/2016 | Katsumata | F16L 19/028 |
| 2017/0276160 | A1 * | 9/2017 | Sadr | F16L 9/17 |
| 2020/0271251 | A1 * | 8/2020 | Gunji | F16L 19/0243 |
| 2022/0018475 | A1 * | 1/2022 | Shetty | B23K 1/19 |
| 2022/0146161 | A1 * | 5/2022 | Hamadate | B23K 1/19 |
| 2022/0316824 | A1 * | 10/2022 | Neumann | B21C 37/123 |
| 2022/0341515 | A1 * | 10/2022 | Barnes | F16L 13/0263 |
| 2022/0348181 | A1 * | 11/2022 | Gunji | F16B 7/18 |
| 2022/0349501 | A1 * | 11/2022 | Hamadate | B23K 33/006 |
| 2023/0168049 | A1 * | 6/2023 | Suei | F28F 21/089 |
| | | | | 165/133 |

FOREIGN PATENT DOCUMENTS

| | | | |
|---|---|---|---|
| DE | 102019008480 | A1 | 4/2021 |
| GB | 768211 | A | 2/1957 |
| KR | 101169753 | B1 | 7/2012 |

* cited by examiner

B(10:1)

HOUSING ASSEMBLY FOR USE IN A HEAT EXCHANGE SYSTEM

CROSS-REFERENCE TO RELATED APPLICATIONS

This application is a National Stage application of International Patent Application No. PCT/EP2023/059934, filed on Apr. 17, 2023, which claims priority to Danish Patent Application No. PA202200643, filed on Jul. 4, 2022, each of which are hereby incorporated by reference in their entirety.

TECHNICAL FIELD

The present invention pertain to a housing assembly for use in a heat exchange system. The housing assembly comprises an aluminium housing with at least two fluid ports, wherein each fluid port is connected to a bi-metal connector, wherein the bi-metal connector comprises an inner copper layer and an outer stainless steel layer, and wherein the aluminium housing comprises connection portions for connecting the bi-metal connectors.

BACKGROUND

Housing assemblies for use in heat exchange systems are pressure tight compartments for components such as valves and/or sight glasses. The housing assemblies are designed for use with refrigeration or air conditioning systems. They may be the component of the corresponding system, which are subjected to the system pressure and have the primary function of containing the system pressure. There are typically no restrictions on the components inside the housing with regards to their capability to handle pressure. The housing assemblies are typically made of brass such that they can easily be joined to copper fluid conduits. Typically, refrigeration systems or heat exchange systems have copper conduits in which a refrigerant fluid flows. Valve housings and other housings are typically made out of brass.

The housing assembly can have secondary functions like providing flow paths, guiding surfaces, sliding surfaces and similar mechanical, thermal, flow-related or thermodynamic functions. A typical refrigeration valve housing assembly or line component housing assembly will have one or more fluid ports, depending on the required function and/or design. These fluid ports are used to connect the internal void i.e. the pressurized part of the housing assembly with the system, to which the housing assembly is connected. When connecting a line component or valve to a system, brazing is the industry standard of installation, though there are other principles like glue/sealant based methods, threaded connections, flare connectors etc.

When mounting valves with brass housings and cupper connectors in a refrigeration system with copper conduits in the field, typically challenges are encountered such as debrazing of the valve connectors from the brass housing and a significant influx of heat, which may harm elements within the valve, such as e.g. O-rings and gaskets.

Instead of using brass for the housing, aluminium housing assemblies may be used for e.g. cost reasons or to reduce the amount of lead in the housing alloy. These aluminium housings typically still need to be fluidly connected to copper conduits at the site of the heat exchange system. This may lead to problems related to the connection of the dissimilar materials of the housing and the copper conduits. For example, galvanic corrosion may occur on the outer surfaces of aluminium components. Existing heat conductance issues are also getting worse, as aluminium conduits conduct heat better than brass conduits.

Once the conduit is joined to the housing, the joint is required to be cleaned and excess material needs to be removed in case of e.g. friction welded joints. Furthermore, in order to ensure correct functioning of the housing assembly, the housing assembly needs to be leak tested prior to its use. The above items are typically difficult to handle in the field, especially for joints of dissimilar material components.

SUMMARY

The aim of the present invention is to overcome the problems mentioned above. This aim is attained by an improved housing assembly according to claim 1 and a set according to claim 7. Preferable embodiments are subject to the dependent claims.

According to claim 1, a housing assembly for use in a heat exchange system is provided. The housing assembly comprises an aluminium housing with at least two fluid ports, wherein each fluid port is connected to a bi-metal connector, wherein the bi-metal connector comprises an inner copper layer and an outer stainless steel layer, and wherein the aluminium housing comprises connection portions for connecting the bi-metal connectors.

The presently described housing assembly comprises the aluminium housing or body and connectors of a different material than the aluminium housing. It is possible to use highly specialized joining equipment at e.g. a production site of the housing assembly for joining the different materials of the housing assembly's components. This opens the opportunity of using joining methods that are not suitable in the field and may be difficult to handle for certain users of the housing assembly, such as OEMs.

The above outlined problems of the prior art are solved by using a stainless steel connector with copper coating on the inside. The coating can be applied mechanically. An alternative approach is to apply the coating via a galvanic coating. This will however place copper on both the inside and outside of the connector. Such a connector cannot be used due to galvanic corrosion happing on the outer surface of the aluminium component, unless the copper is removed e.g. mechanically on the outside.

When replacing the typical brass housing with an aluminium housing, the heat influx increases as well as the risk of galvanic corrosion happening on the outer surface of the valve due to dew condensing on the valve housing exposed to atmospheric oxygen. These obstacles are overcome by using bimetal connectors.

Bimetal connectors are stainless steel tubes with an e.g. 40 micrometre layer of copper. They reduce the heat influx, as stainless steel is a considerably poorer heat conductor than copper. Galvanic corrosion is also reduced, as iron is closer to aluminium than to copper components in terms of their respective galvanic potential.

The present inventions makes it possible to utilize non-hot assembly methods like friction welding or magnetic pulse welding, which have the advantage that they cannot be easily destroyed or debrazed when the housing assembly is installed in the field or at an OEM. It is possible to easily connect the presently described housing assembly to e.g. copper pipes, even though the housing assembly comprises an aluminium housing. This means that standard methods, which are used, for connecting copper housings to copper pipes may be used for connecting the aluminium housing of the presently described housing assembly to copper pipes via the connectors. As a result, from a practical point of view, the presently described housing assembly may be handled as if it was made of brass and/or copper rather than aluminium. The present invention simplifies the replacement of brass housings with aluminium housing. Aluminium is cheaper than brass and the price difference is expected to grow over time. Furthermore, aluminium can be easier reused compared to brass and therefore it is considered to be the better choice from an environmental point of view.

In a preferred embodiment of the invention, the connection portions comprise threaded portions, welding portions, and/or brazing portions. The connection portions may be oriented coaxially with respect to each other. The connection portions may protrude from a central structure of the aluminium housing and/or may be formed integrally with the remainder of the aluminium housing.

In another preferred embodiment of the invention, the inner copper layer is brazed and/or welded to the aluminium housing. The connector may comprise some flange portion oriented in a radial direction of the connector. The inner copper layer may be provided at least partially on the flange portion for contacting the connection portion of the aluminium housing.

In another preferred embodiment of the invention, the bi-metal connector is furnace brazed, conveyor belt brazed, induction brazed, laser brazed, laser welded without a filler, laser welded with a filler, stir welded, rotational welded, ultrasonic welded, electromagnetic pulse welded, TIG welded, and/or MIG welded to the aluminium housing. Typically, a single joining technology may be used. However, combinations of two or more of the above joining technologies may be applied in alternative embodiments.

In another preferred embodiment of the invention, the outer stainless steel layer covers all or a substantial portion of the inner copper layer. An interior side of the stainless steel layer may be connected to an exterior side of the inner copper layer via e.g. a material connection.

In another preferred embodiment of the invention, a sleeve nut is screwed to the threaded portion of the connection portions and a portion of the bi-metal connector is provided between the sleeve nut and the connection portion. The flange portion of the bi-metal connector may hence be used for receiving a pressure from the sleeve nut, forcing the connector against the connection portions of the aluminium housing.

The invention is also directed at a set comprising an aluminium housing, at least one bi-metal connector and a sleeve nut for a housing assembly according to at least claim 6. The set may be provided in a state, in which its components are at least partially disconnected from each other. A user may connect the components according to existing requirements. The components may be arranged in a single dedicated package. Alternatively. The components may be provided separated from each other first and brought together only at a later stage. The components of the present invention's housing assembly may therefore be provided in a separated state, but still be covered by the present invention's scope.

BRIEF DESCRIPTION OF THE DRAWINGS

Further details and advantages of the invention are described with reference to the figures. The figures show.

DETAILED DESCRIPTION

Figure 1:
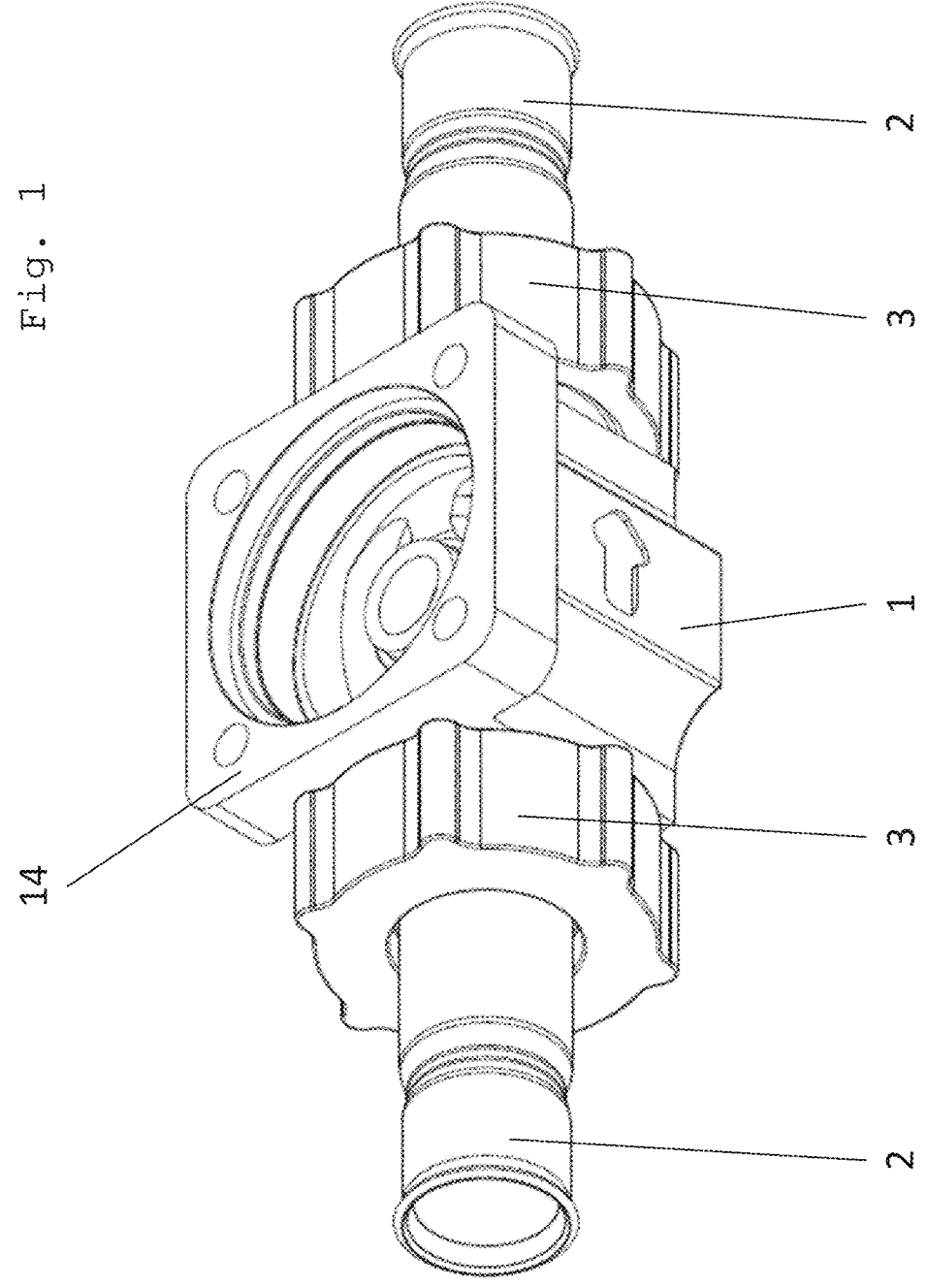
FIG. 1: a perspective view of a first embodiment of the housing assembly.

FIG. 1 shows a perspective view of a first embodiment of the housing assembly. The housing assembly is provided for use in a heat exchange system, such as an air conditioning system, a heat pump or a refrigeration application. The housing assembly comprises an aluminium housing 1 to which two bi-metal connectors 2 are connected. In the first embodiment, sleeve nuts 3 or similar structures may be provided for fixing the connectors 2 to the aluminium housing 1. The connectors 2 may be provided on opposite sides of the aluminium housing 1. The connectors 2 may be formed cylindrically and/or may be arranged coaxially to each other.

The aluminium housing 1 may comprise a side flange portion 14. The side flange portion 14 is provided for connecting valve elements, sight glasses or other components to the housing assembly. The side flange portion 14 may be connected to a side housing containing said valve elements and/or other components. The side flange portion 14 may be arranged in parallel to the axes of the connectors 2. The side flange portion 14 may comprise an opening, which communicates with the inside of the aluminium housing.

Figure 2:
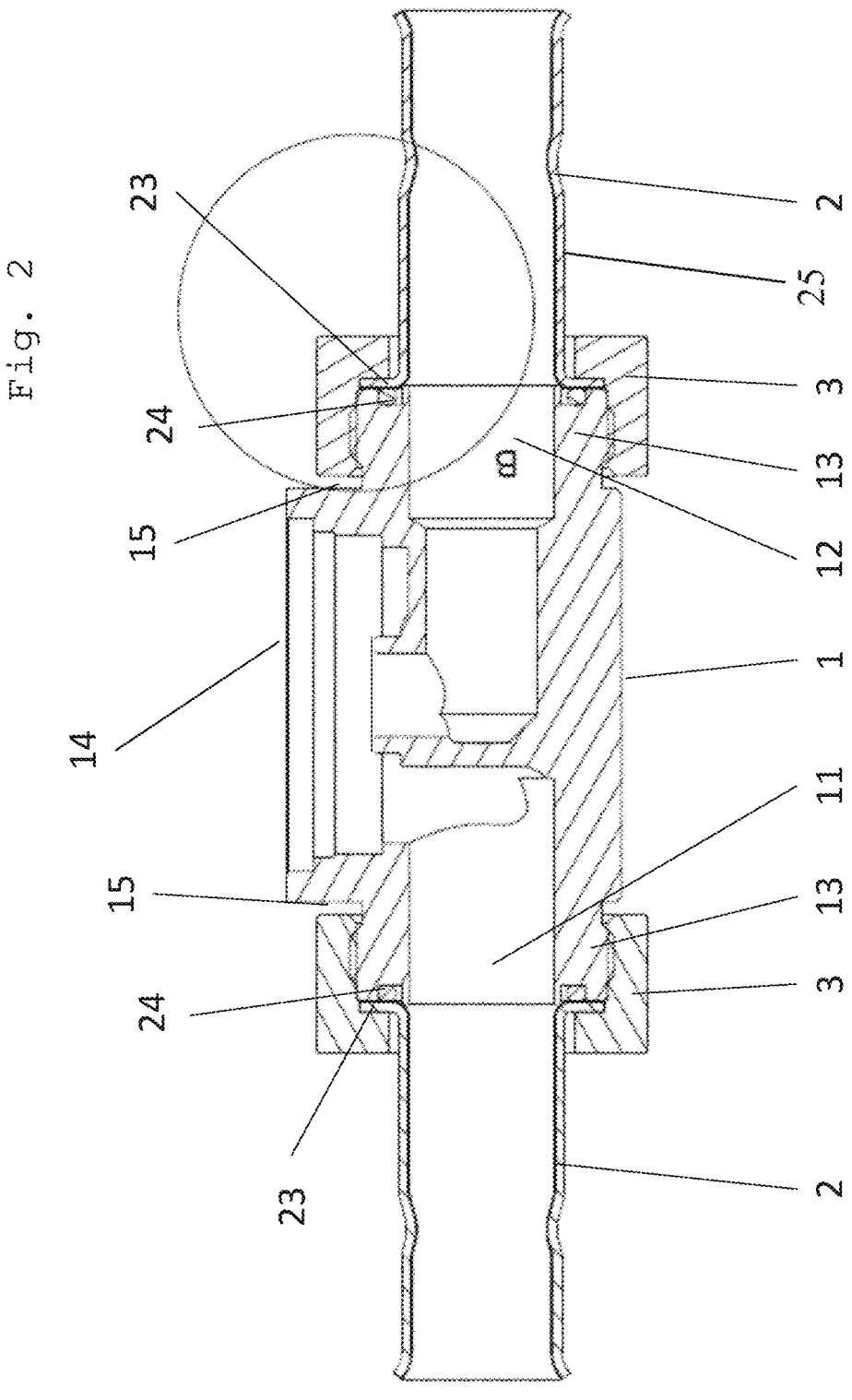
FIG. 2: a section view of the first embodiment of the housing assembly.

FIG. 2 shows a section view of the first embodiment of the housing assembly. The aluminium housing 1 comprises at least two fluid ports 11, 12. The fluid ports 11, 12 may communicate with the side flange portion 14. Each fluid port 11, 12 is fluidly connected to a bi-metal connector 2. The connectors 2 contact connection portions 13 of the aluminium housing 1.

The connectors 2 comprise a flange portion 23 each, which is an end portion of the connectors 2 contacting the aluminium housing 1. The connectors 2 are pressed against the aluminium housing 1 via the flange portions 23 by means of the sleeve nuts 3. The flange portions 23 may have the same outer diameter as the fluid ports 11, 12 at their contact surface.

Seals 24 may be provided within a groove of the connection portions 13 sealing the connection portions 13 against the flange portions 23. The seals 24 may be made of an elastic material and prevent leakage between the inside of the fluid ports 11, 12 and the outside of the structure.

There may be a narrow circumferential gap 15 between the side flange portion 14 and the sleeve nut 3. The width of the gap 15 may correspond to 50% to 200% of the thickness of the connector 2 walls. The connectors 2 may be formed as identical parts. In alternative embodiments, the fluid ports 11, 12 may be arranged other than coaxially. For example, the fluid ports 11, 12 may be arranged at an angle of between 0° and 180° to each other.

The connection portions 13 of the aluminium housing 1 are provided for connecting the aluminium housing 1 to the connectors 2. The fluid ports 11, 12 may be arranged at least partially within the connection portions 13. The connection portions 13 of the first embodiment comprise threaded portions for screwing the sleeve nut 3 to the aluminium housing 1.

The connection portions 13 may be oriented coaxially with respect to each other. The connection portions 13 may be oriented concentrically with respect to their respective fluid port 11, 12. The connection portions 13 and/or the side flange portion 14 may protrude from a central structure of the aluminium housing 1 and/or may be formed integrally with the remainder of the aluminium housing 1.

Figure 3:
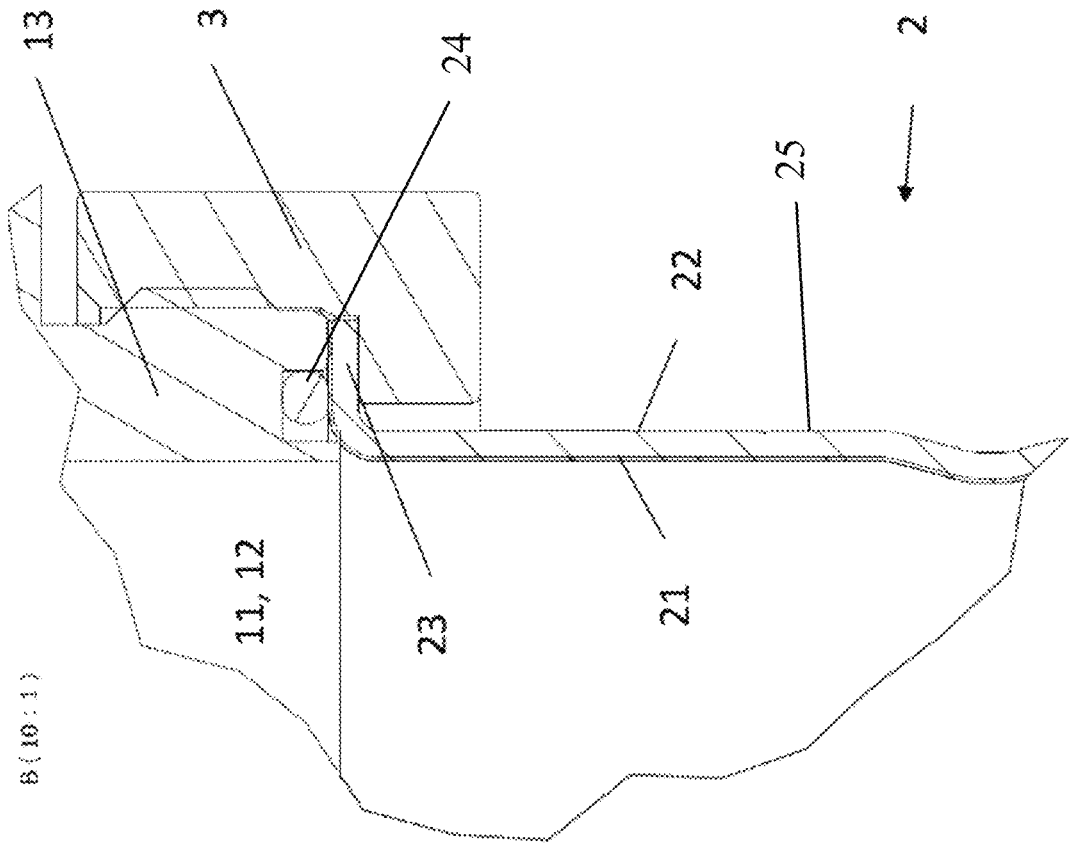
FIG. 3: a detailed section view of the first embodiment of the housing assembly.

FIG. 3 is a detailed section view of the first embodiment of the housing assembly. One portion of a connector 2 is shown fixed against a connection portion 13 by means of a sleeve nut 3. The sleeve nut 3 is screwed onto a threaded portion of the connection portion 13 and presses the connector 2 against the connection portion 13. A portion of the connector 2 is provided between the sleeve nut 3 and the connection portion 13. The flange portion 23 of the bi-metal connector 2 may hence be used for receiving a pressure from the sleeve nut 3, forcing the connector 2 against the connection portions 13 of the aluminium housing 1.

The connector 2 comprise an inner copper layer 21 and an outer stainless steel layer 22. The inner diameter of the inner copper layer 21 may be equal to the inner diameter of the fluid port 11, 12. The flange portion 23 of the connector may be arranged perpendicular to a cylindrical portion 25 of the connector 2.

The copper interiors of the bi-metal connectors 2 make it possible to easily connect the housing assembly to e.g. copper pipes. The copper pipes are not shown in the figures. The copper pipes are usually used to fluidly connect the housing assembly to some heat exchange system.

As the housing assembly comprises an aluminium housing 1, a direct connection, such as brazing, between the housing assembly and some external copper conduits would be much more difficult to provide on the site of a heat exchange system.

The presently described housing assembly comprising the connected bi-metal connectors 2 makes it possible to fluidly connect the housing assembly to any suitable copper conduit by e.g. brazing the copper conduit to the inner copper layer 21 of the connector 2. This can be easily done at any given site, as it does not required complicated joining methods.

Standard methods, which are used for connecting copper components to each other, may hence be used for connecting the aluminium housing 1 of the presently described housing assembly to copper pipes. As a result, the presently described housing assembly may be handled as if it was made entirely of more expensive brass/copper materials rather than the presently used aluminium.

Figure 4:
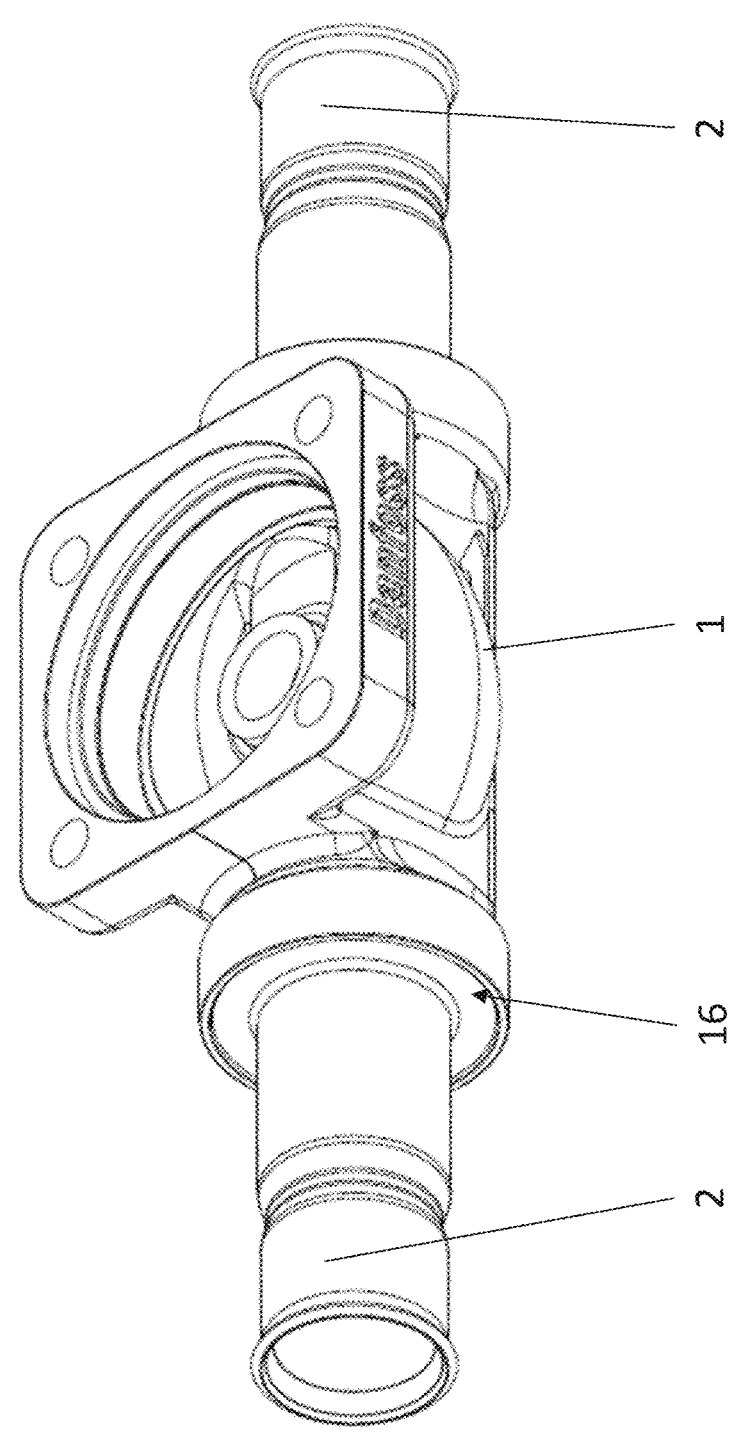
FIG. 4: a perspective view of a second embodiment of the housing assembly.

FIG. 4 is a perspective view of a second embodiment of the housing assembly. In contrast to the first embodiment, no sleeve nuts 3 are used to connect the connectors 2 to the aluminium housing 1. Rather, circumferential grooves 16 are provided at the aluminium housing 1, into which the connectors 2 may be partially inserted.

Figure 5:
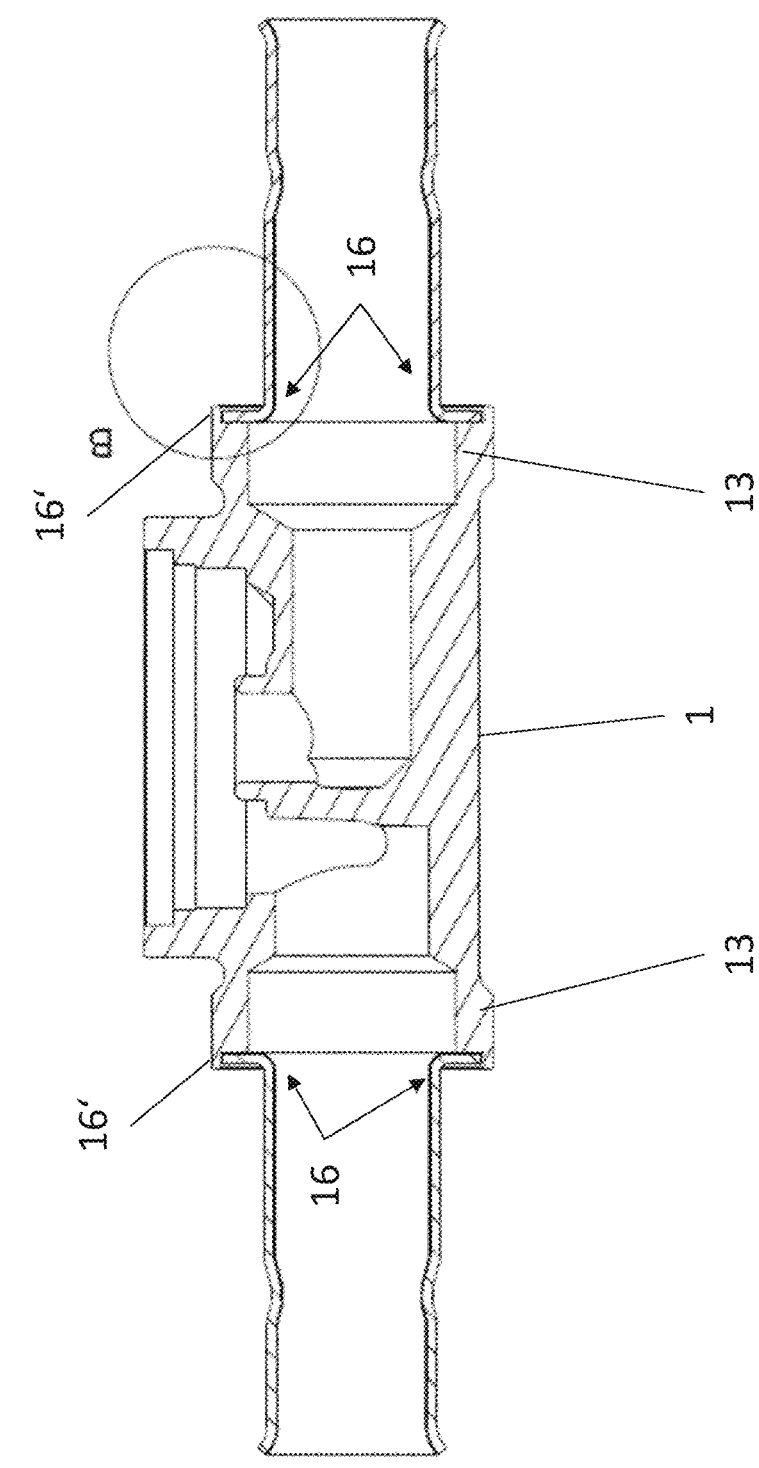
FIG. 5: a section view of the second embodiment of the housing assembly.

FIG. 5 is a section view of the second embodiment of the housing assembly. The connection portions 13 of the second embodiment comprise the circumferential grooves 16, which are bound by radially outer walls 16'. The grooves 16 may have a circular plane surface contacting the connector 2 and extending in a radial direction. The grooves 16 may comprise welding portions and/or brazing portions for connecting the connector 2 to the aluminium housing 1. The welding and/or brazing portions may extend in a circumferential direction of the grooves 16. The radial, axial and circumferential directions may be referenced to the cylindrical connector 2 geometry.

Figure 6:
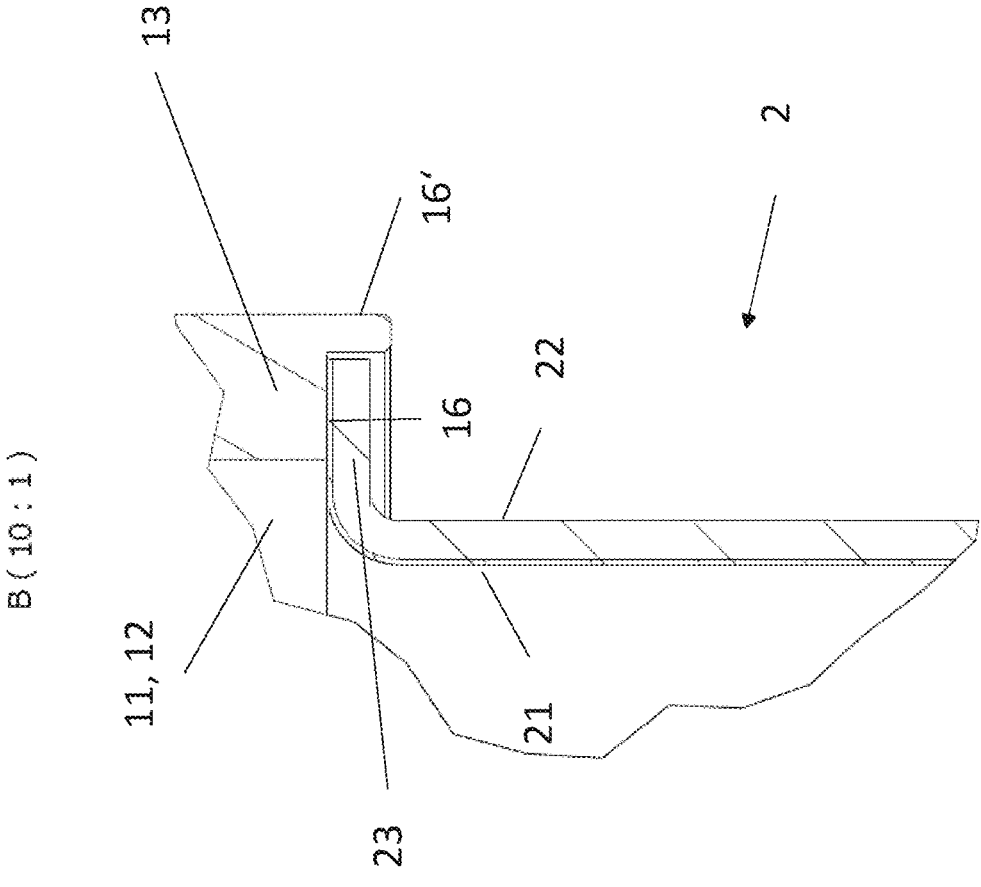
FIG. 6: a detailed section view of the second embodiment of the housing assembly.

FIG. 6 is a detailed section view of the second embodiment of the housing assembly. As can be seen more clearly than in the previous figure, the inner copper layer 21 is brazed and/or welded to the connection portion 13 of the aluminium housing 1. The connector 2 may comprise a flange portion 23 oriented in a radial direction of the connector. The inner copper layer 21 may be provided at least partially on the flange portion 23 for contacting the connection portion 13 of the aluminium housing 1. The connections portion 13 may be formed integrally with the housing 1.

The bi-metal connector 2 may be furnace brazed, conveyor belt brazed, induction brazed, laser brazed, laser welded without a filler, laser welded with a filler, stir welded, rotational welded, ultrasonic welded, electromagnetic pulse welded, TIG welded, and/or MIG welded to the aluminium housing 1. Typically, a single joining technology may be used. However, combinations of two or more of the above joining technologies may be applied as well. The connection between the connector 2 and the connection portion 13 may be provided along the flange portion 23 and the groove 16.

The outer stainless steel layer 22 covers all or a substantial portion of the inner copper layer 21. An interior side of the stainless steel layer 22 may be connected to an exterior side of the inner copper layer 21 via a material connection.

The invention is also directed at a set comprising an aluminium housing 1, at least one bi-metal connector 2 and a sleeve nut 3 for a housing assembly according to at least claim 6. The set may be provided in a state, in which its components are at least partially disconnected from each other. A user may connect the components according to existing requirements.

The presently described invention also covers embodiments, in which the features of the various embodiments are be combined with each other.

While the present disclosure has been illustrated and described with respect to a particular embodiment thereof, it should be appreciated by those of ordinary skill in the art that various modifications to this disclosure may be made without departing from the spirit and scope of the present disclosure.

What is claimed is:

1. A housing assembly for use in a heat exchange system, comprising an aluminum housing with at least two fluid ports, wherein each fluid port is connected to a bi-metal connector, wherein the bi-metal connector comprises an inner copper layer and an outer stainless steel layer, and wherein the aluminum housing comprises connection portions for connecting the bi-metal connectors.

2. The housing assembly according to claim 1, wherein the connection portions comprise threaded portions, welding portions, and/or brazing portions.

3. The housing assembly according to claim 2, wherein a sleeve nut is screwed to the threaded portion of the connection portions and that a portion of the bi-metal connector is provided between the sleeve nut and the connection portion.

4. The housing assembly according to claim 2, wherein the inner copper layer is brazed and/or welded to the aluminum housing.

5. The housing assembly according to claim 2, wherein the bi-metal connector is furnace brazed, conveyor belt brazed, induction brazed, laser brazed, laser welded without a filler, laser welded with a filler, stir welded, rotational welded, ultrasonic welded, electromagnetic pulse welded, TIG welded, and/or MIG welded to the aluminum housing.

6. The housing assembly according to claim 2, wherein the outer stainless steel layer covers all or a substantial portion of the inner copper layer.

7. The housing assembly according to claim 1, wherein the inner copper layer is brazed and/or welded to the aluminum housing.

8. The housing assembly according to claim 7, wherein the bi-metal connector is furnace brazed, conveyor belt brazed, induction brazed, laser brazed, laser welded without a filler, laser welded with a filler, stir welded, rotational welded, ultrasonic welded, electromagnetic pulse welded, TIG welded, and/or MIG welded to the aluminum housing.

9. The housing assembly according to claim 7, wherein the outer stainless steel layer covers all or a substantial portion of the inner copper layer.

10. The housing assembly according to claim 1, wherein the bi-metal connector is furnace brazed, conveyor belt brazed, induction brazed, laser brazed, laser welded without a filler, laser welded with a filler, stir welded, rotational welded, ultrasonic welded, electromagnetic pulse welded, TIG welded, and/or MIG welded to the aluminum housing.

11. The housing assembly according to claim 10, wherein the outer stainless steel layer covers all or a substantial portion of the inner copper layer.

12. The housing assembly according to claim 1, wherein the outer stainless steel layer covers all or a substantial portion of the inner copper layer.

13. A set comprising:

an aluminum housing comprising connection portions and at least two fluid ports;

a bi-metal connector comprising an inner copper layer and an outer stainless steel layer; and a sleeve nut configured to connect to the connection portions;

wherein each fluid port is configured to connect to the bi-metal connector;

wherein the connection portions are configured to connect to the bi-metal connector, the connection portions comprising threaded portions, welding portions, and/or brazing portions; and wherein the sleeve nut is configured to screw to the threaded portion of the connection portions such that a portion of the bi-metal connector is provided between the sleeve nut and the connection portion.

\* \* \* \* \*